United States Patent [19]

Nyce

[11] Patent Number: 5,070,485
[45] Date of Patent: Dec. 3, 1991

[54] LOW POWER MAGNETOSTRICTIVE SENSOR

[75] Inventor: David S. Nyce, Raleigh, N.C.

[73] Assignee: MTS Systems Corporation, Minneapolis, Minn.

[21] Appl. No.: 589,680

[22] Filed: Sep. 28, 1990

[51] Int. Cl.$^5$ ............................................. G01S 15/08
[52] U.S. Cl. .................................................... 367/127
[58] Field of Search ............... 367/118, 127, 128, 908; 73/597

[56] References Cited
U.S. PATENT DOCUMENTS
4,238,844 12/1980 Ueda et al. ......................... 367/127

Primary Examiner—Daniel T. Pihulic
Attorney, Agent, or Firm—Merchant, Gould, Smith, Edell, Welter & Schmidt

[57] ABSTRACT

A magnetostrictive linear position transducer generating a 4–20 ma output in response to the position of a position indicating magnet. System resolution is enhanced by averaging in the analogue domain, a digitally developed position location signal.

9 Claims, 5 Drawing Sheets

LOW POWER MAGNETOSTRICTIVE SENSOR

BACKGROUND OF THE INVENTION

1. Field of the Invention

The present invention relates to magnetostrictive transducers or gauges. The magnetostrictive position transducer gauge which is disclosed incorporates several novel subsystems. More particularly the preferred transducer contains, a low power pulse generator module; a high resolution time measurement module; and a position measurement to current conversion module. These structures cooperate together to produce a "4–20 ma transmitter standard", magnetostrictive linear position transducer.

2. Description of the Prior Art

In general, magnetostrictive position sensors include a ferromagnetic delay line, which is occasionally called a "waveguide" A pulse generator supplies a current pulse to the delay line which generates a magnetic field which surrounds the delay line. A remote and movable position indicating magnet is positioned along the delay line. The magnetic field of the position magnet disturbs the magnetic field generated by the current pulse.

The interaction between the permanent magnetic field of the position magnet and the magnetic field induced by the current pulse causes a strain or mechanical reaction within the delay line. This strain induced reaction force within the delay line, is propagated along the length of the delay line as an acoustic torsional wave.

A detector, called a mode converter, is typically attached to one end of the delay line. This element detects the passage of the torsional acoustic wave and converts it into a representative electrical signal.

The time delay period from the excitation of the waveguide to the reception of the corresponding acoustic wave at the mode converter indicates the position or location of the position magnet along the length of the delay line.

A variety of time measurement, or intervalometer techniques have been used to convert the time period information into a position indicating signal.

For example, U.S. Pat. No. 3,898,555 to J. Tellerman, uses a fixed frequency oscillator to excite the delay line. The returned acoustic signal, in conjunction with the fixed frequency oscillator, develops a signal which is "pulse width modulated" by the position of the magnet along the delay line. An integrator converts the pulse width modulated waveform to a dc voltage level which forms the transducer output.

U.S Pat. No. 4,721,902 to J. Tellerman et al. teaches inter alia, a method to convert the "pulse width modulated signal" into a digital value. The patent teaches the use of a conversion counter to collect "counts" from a conversion oscillator during the "on" time of the pulse width modulated signal.

This patent also teaches a method to enhance position resolution by utilizing the returned acoustic signal to initiate the next excitation pulse. In this fashion a "burst" of interrogation pulses are used to accumulate a large number of "counts" to enhance the resolution of the position signal.

Magnetostrictive position sensor devices of this type are used in the measurement and control industry and find use in machine tools, robotics, liquid level indicators as well as other applications.

To facilitate the use of various types of transducers, produced by a variety of manufacturers, industry has adopted a current mode transducer standard referred to as the "4–20 milliamp transmitter" standard. Under this standard, transducers are supplied as a two terminal device. In use, the two terminal transducer device is coupled to a power supply (24 volts, D.C.) and the amount of current drawn by the transducer from the power supply indicates the measured value of the transduced signal. For example, a pressure sensor may draw 4 ma of current from the remote power supply at the minimum pressure, and 20 ma at the maximum pressure, while intermediate pressures would correspond to intermediate current draws.

The magnetostrictive measurement technique requires the delivery of high current pulses to excite the delay line. As a consequence, traditional methods of exciting and operating a magnetostrictive position sensor have been unsuitable for operation in accordance with the 4–20 ma standard.

SUMMARY OF THE INVENTION

In contrast to prior art magnetostrictive measurement systems, the present invention includes a number of structures which cooperate together to convert the position measurement signal, to a current draw output signal which meets the 4–20 ma standard.

The architecture of the transducer includes several structural elements in combination.

These elements include a low frequency, sampling clock which excites the delay line at a relatively low, fixed rate. This pulse generator circuitry generates high current interrogation pulses, but has a low average current draw.

The elements also include, a time measurement system which converts the acoustic delay time to a digital value through the operation of a conversion clock and a conversion counter. The time measurement system uses a fixed time interval blanking timer to initiate the time interval measurement. The digital value is then reconverted to an analog signal.

The elements also include a resolution enhancement system where the time measurement system is enhanced by averaging the analog signal over a time interval which reflects several position measurements.

The elements also include circuitry to convert the averaged measurement to a current draw for the transducer which encodes the position signal onto the power supply leads.

BRIEF DESCRIPTION OF THE DRAWINGS

In the drawing, like reference numerals indicate corresponding structures throughout the several views in which.

DETAILED DESCRIPTION OF THE PREFERRED EMBODIMENT

In the following description, reference is made to an illustrative embodiment for carrying out the invention. It is understood that other embodiments may be utilized without departing from the scope of the invention.

OVERVIEW

Figure 1:
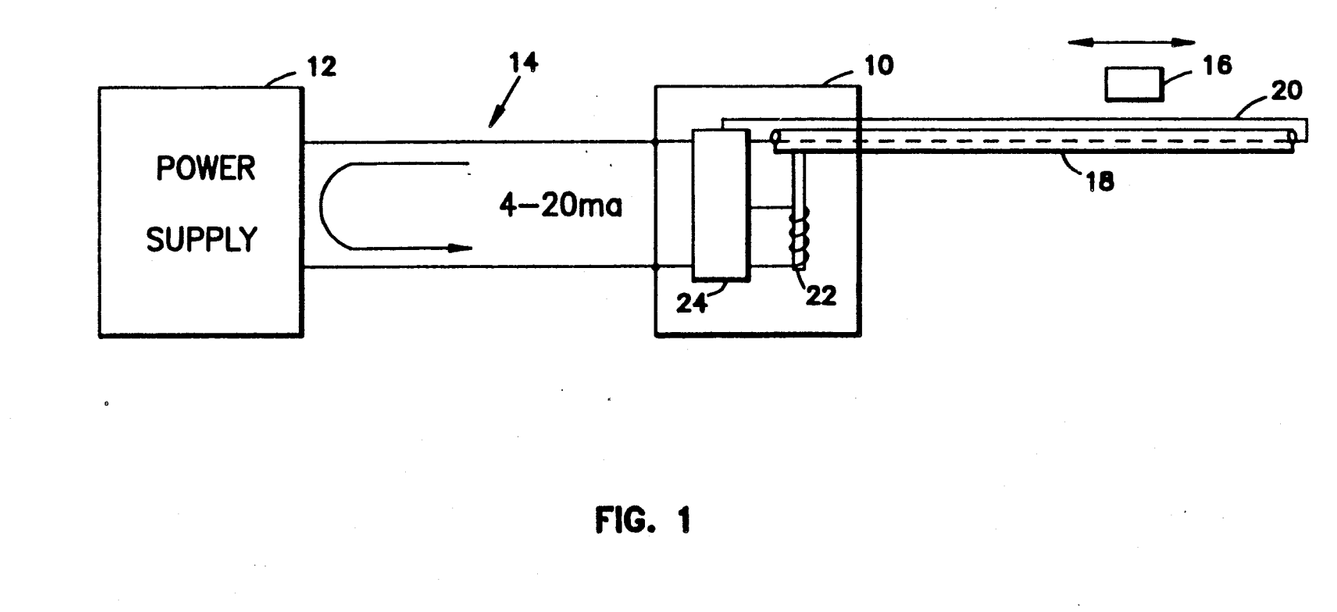
FIG. 1 is a block diagram depicting the interconnection between the transducer and the power supply.

As shown in FIG. 1 the magnetostrictive transducer 10 is connected to a remote power supply 12 through a two conductor current loop 14. The position of the magnet 16 along the length of the delay line 18 is reflected by the current which the transducer 10 draws from the power supply 12. In general, the magnitude of this draw will vary between 4 and 20 milliamps depending on the position of the moveable position indicating magnet 16.

The magnetostrictive delay line of the present invention may take any one of a number of conventional forms. Typical configurations include a ferromagnetic tube 18 with a coaxial return conductor as shown. Other forms may comprises a solid ferromagnetic rod, either round or rectangular in cross-section with a parallel return conductor.

The electronic module 24 contains the control logic and signal processing circuitry. A low frequency sampling clock is provided which triggers a short 1 microsecond, 20 volt pulse is supplied to the delay line. The induced magnetic field associated with this pulse interacts with the magnetic field of the position magnet 16 which results in a mechanical reaction within the tube 18 at the location of the magnet 16. This interaction generates an acoustic pulse which propagates along the tube and is detected by a mode converter 22.

The mode converter may take many forms, however a common configuration involves a tape armature coupled to the periphery of tube 18, which moves within a coil of wire when the sonic pulse passes the location of the converter. The translational motion imparted to the armature by impulse rotation of the tube gives rise to an electrical signal within the coil which is supplied to the electronic module 24.

Since the speed of propagation in the tube is fixed, one can determine the location of the acoustic wave source by measuring the time required to receive the acoustic pulse. In operation, the time interval between the excitation pulse, initiated by the sampling clock, and the acoustic pulse returned from the permanent magnet, indicates the distance from the mode converter 22 to the magnet 16.

This propagation time interval is measured, averaged and converted into a current for transmission along the power supply lines.

The digital time measurement process is accomplished by accumulating counts in a conversion counter during a time period or conversion window defined by control logic.

The control logic includes a "blanking" timer which operates to exclude the spurious output of the mode converter 22, which occurs as a result of exciting the delay line tube 18. In the illustrative embodiment of the transducer shown it is preferred to "start" the blanking interval with the sampling clock. It is also preferred to use the logic state of the blanking timer to gate out, or exclude, mode converter output pulses which occur during the blanking time interval. In the illustrative embodiment, the mode converter output is used to turn off the conversion clock to end the time measurement process. These choices reduce component count and minimize current draw. However, it should be apparent that other methods of ending the time measurement process can be used. Also other techniques can be used to eliminate the spurious mode converter output.

It is preferred to use the conclusion of the blanking interval, to define the starting point of the conversion window. However, counting conversion clock pulses during the blanking interval may be acceptable in some implementations of the invention.

Control logic is coupled to the mode converter to stop the conversion process upon the receipt of the acoustic pulse returned from the position indicating magnet.

The high frequency conversion oscillator is not synchronized with the sampling clock to aid the resolution enhancement schema.

SYSTEM TIMING

Figure 2:
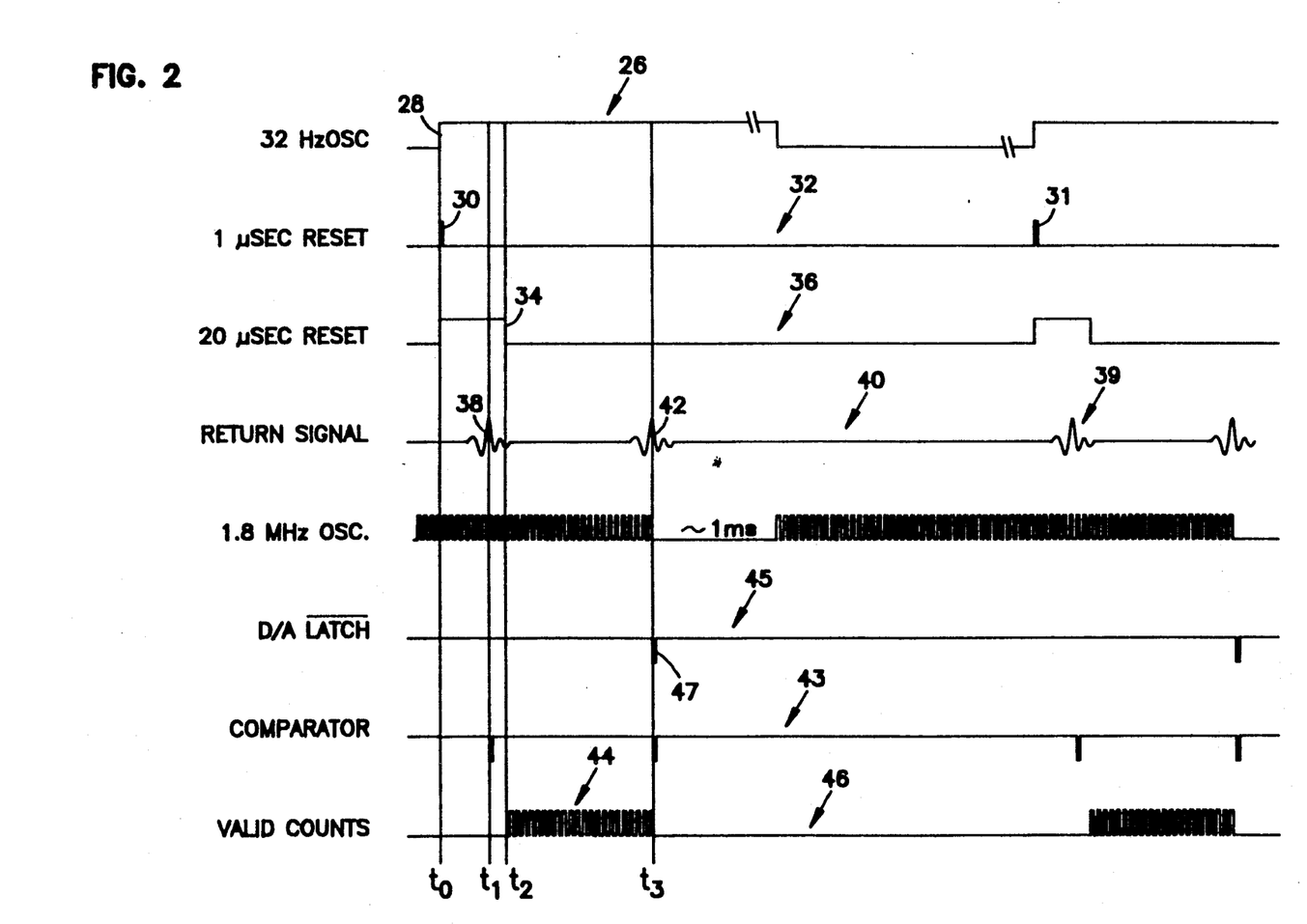
FIG. 2 is a timing diagram depicting the relationship between signals generated during the course of making a position measurement.

FIG. 2 is a timing diagram depicting the relationship between control logic waveforms and signal conversion waveforms generated during the course of a position measurement.

The waveform 26 reflects the output of the low frequency sampling clock as taken from the output pin 60 of the comparator forming a portion of the sampling clock 52. In a preferred embodiment, position measurements are taken at a rate of 32 samples per second. The rising edge 28 of the sampling clock defines time, to and initiates the delivery of an excitation pulse to the delay line waveguide 18 as indicated by pulse 30 on waveform 32.

Waveform 32 is taken from the output pin 62 of the pulse forming one shot 54. This signal is the triggering pulse for the power amplifier 56.

The waveform 40 presents the output of the mode converter 22. In general, the mode converter output is amplified by a high gain amplifier 60. The amplified output, is compared to a threshold value in a comparator 62. The logic level output of comparator 62 is depicted on waveform 43.

Signal complex 38 and signal complex 39, are generated by the delivery of the excitation or interrogation pulses 30 and 31. These events are exclude by the blanking timer 58. Coincident with the generation of the excitation pulse is the initiation of a blanking pulse to exclude the mode converter output pulse which results directly from the excitation of the delay line. This blanking pulse 34 shown on waveform 36 is fixed and extends for approximately 20 microseconds from t0 to t2 on FIG. 2. This blanking pulse 34 is used both, to blank out mode converter pulse 38 shown on waveform 40, by removing the reset from the conversion counter 66 after the pulse 38 has occurred, thus blanking the pulse 38 and enabling the counting process.

In this fashion, the system is configured to receive the delayed, position indicating pulse 42, shown on waveform 40. The duration of the measured time period t2 to t3 corresponds to the travel time for the acoustic pulse along the tube 18. During this time period a high frequency conversion oscillator 64 supplies "counts" to the conversion counter 66. The counts collected are shown as 44 on wave form 46. This time interval is referred to as the conversion window.

The end of the conversion window corresponds to the latch output of the digital to analog converter 68.

It should be appreciated that the conversion clock toggles at a relatively high 1.8MHz rate and draws substantial current from the supply. It is preferred to turn the clock off with the acoustic return pulse 42 which activates the digital to analog conversion latch as shown at 47 on waveform 45. It is preferred to turn on the conversion clock on with the RC timer formed by resistor 71 and capacitor 72. The time constant of this network is short enough to permit conversion clock turn on well in advance of the measurement cycle insuring frequency stability.

Figure 3:
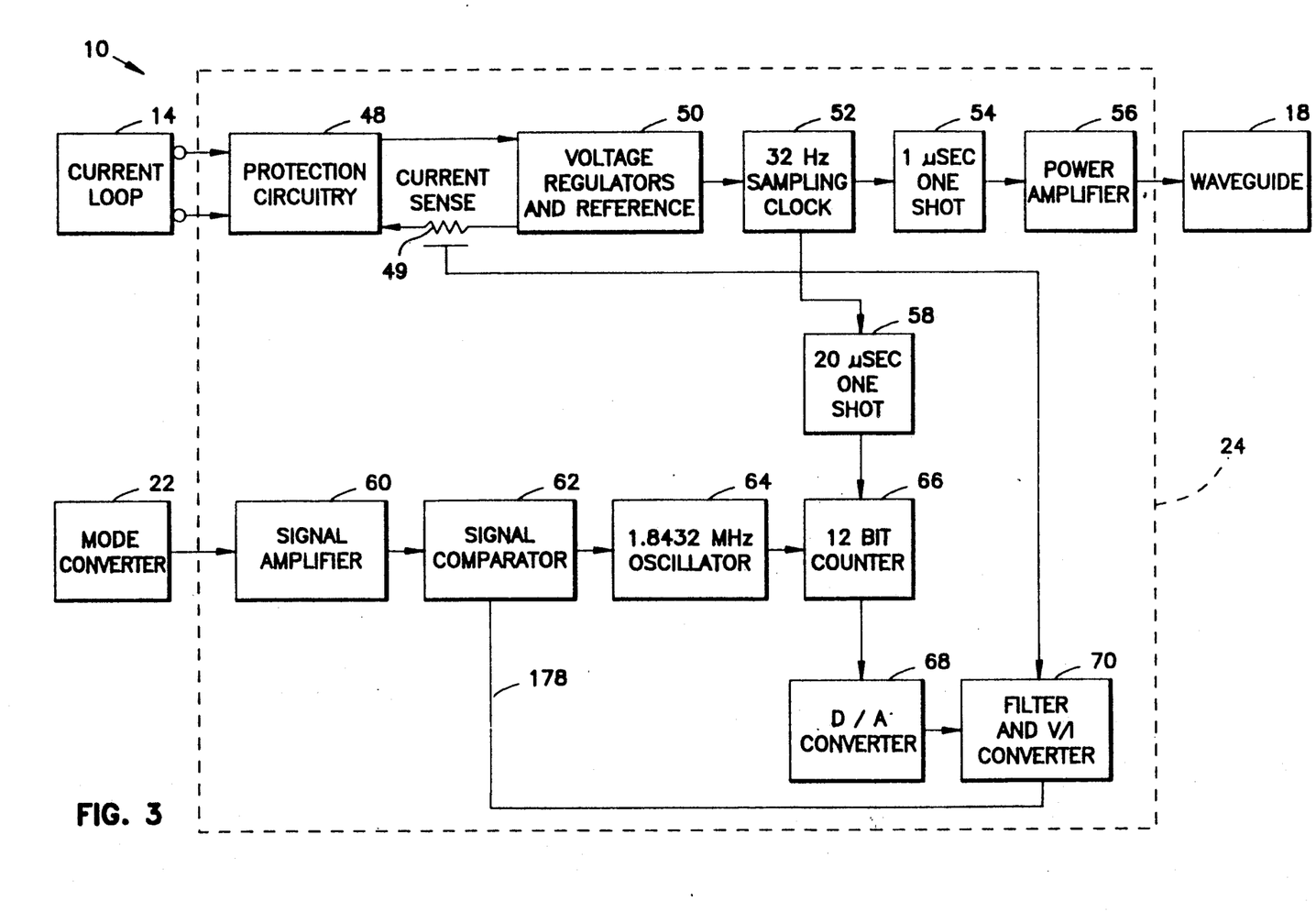
FIG. 3 is a block diagram partitioning the electrical schematic to facilitate discussion of the functional relationships between control logic, and analog signal processing elements and structures of the magnetostrictive transducer system.

FIG. 3 is a block diagram partitioning the electrical schematic to facilitate discussion of the functional relationships between elements and structures of the magnetostrictive transducer system.

The current loop 14 is interfaced with the transducer system 10 through protection circuitry 48. This circuitry serves to shunt over voltages and to protect against over current conditions due to polarity reversal. A current source and several voltage regulators 50 supply the operating voltages to the remaining circuitry.

The sampling clock 52 output serves to initiate the excitation pulse delivered to the waveguide 18 through the power amplifier 56 and triggering one shot 54. The sampling clock 52 also initiates the blanking one shot 58.

The acoustic pulse transduced by the mode converter 22 is amplified in amplifier 60. After suitable amplification the amplitude of the returned signal is compared with a threshold value in comparator 62. In general, valid signals are extracted from noise based upon their amplitude. The detection of the returned pulses turns off the conversion oscillator 64, ending the digital time conversion process. Once the digital value of the time interval is latched in the conversion counter 66. The digital value is converted to an analog voltage level in digital to analog converter 68. Several sequential time interval measurements are converted to an average current value through the operation of the filter and the voltage to current converter 70. The output of the voltage to current conversion is used to modulate the current drawn by the transducer system 10 from the supply 14 through the current sense resistor 49.

Figure 4A:
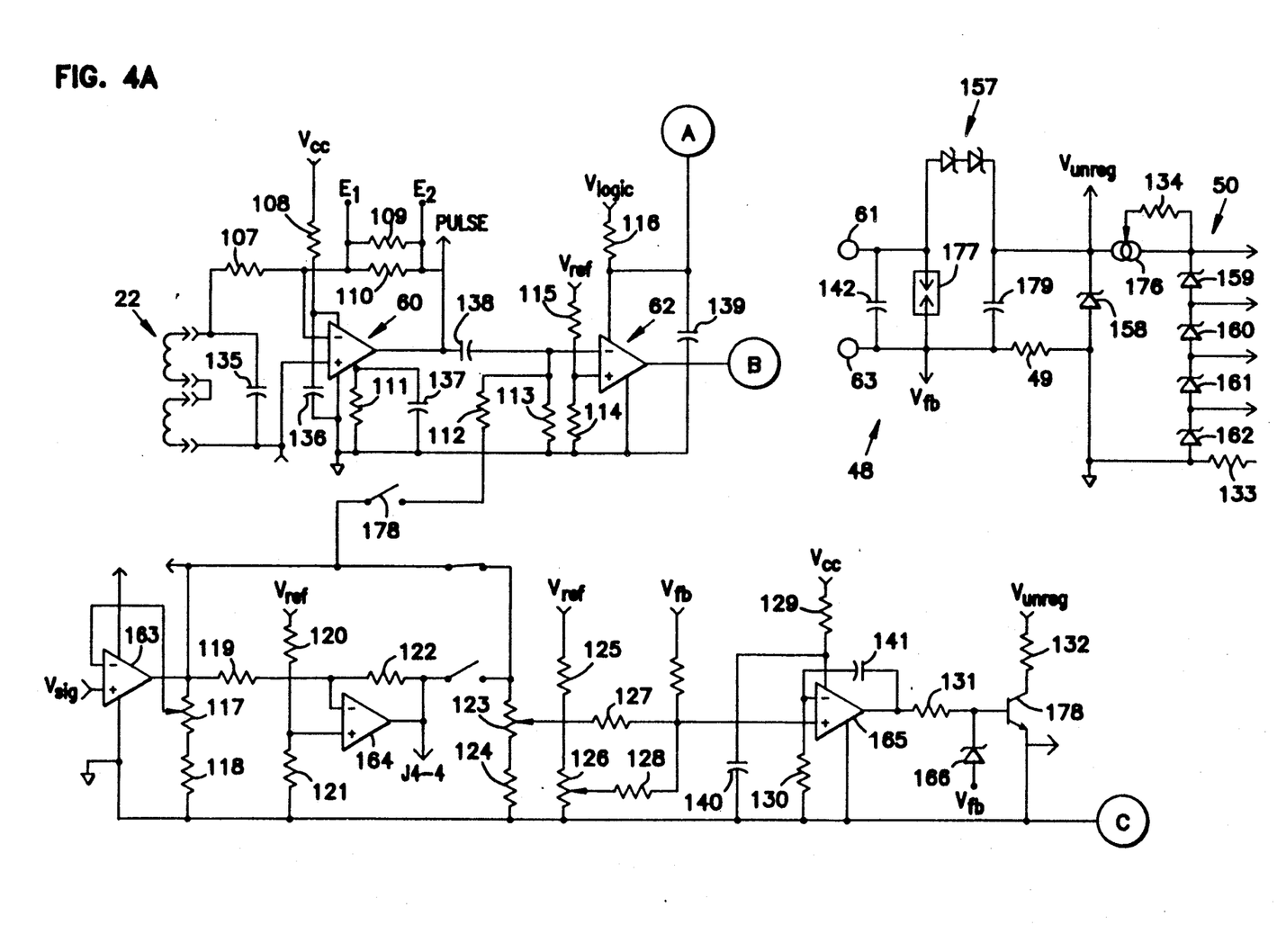
FIG. 4A and 4B are schematic diagram of an illustrative circuit for carrying out the invention. The circuit is divided into two portions with interconnection points depicted in circles.
Figure 4B:
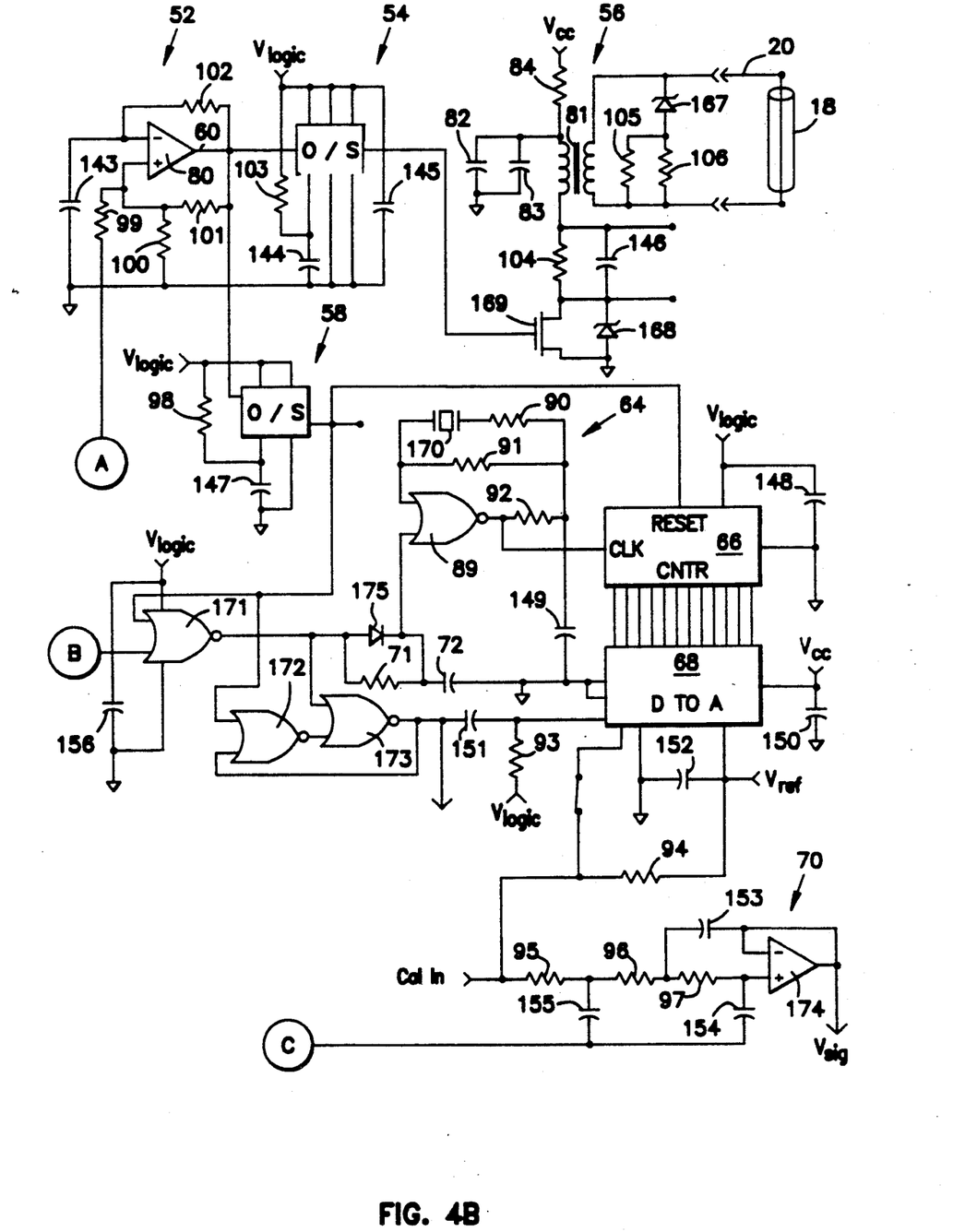

FIG. 4A and 4B are schematic diagram of an illustrative circuit for carrying out the invention. Component types and values are set forth as follows:

| RESISTORS | | CAPACITORS | |
|---|---|---|---|
| 20Ω | 49,134 | 47pf | 72 |
| 1MΩ | 71 | 10μf | 82,83,153 |
| 2KΩ | 84 | 560pf | 135 |
| 2.2Ω | 86,87,104,105,106 | 1μf | 136,139,140,152 |
| 150kΩ | 90 | 100pf | 137,144,147,151 |
| 10MΩ | 91 | .01μf | 138 |
| 10Ω | 92,108,116,129,132,133 | 0.1μf | 141,142,143,145,146,148 |
| 100kΩ | 93,99,101,110 | | |
| 10MΩ | 94 | | 150,156 |
| 80.6KΩ | 95 | .033μf | 154 |
| 121kΩ | 102 | 3.3μf | 155 |
| 732Ω | 96 | | |
| 31.6kΩ | 97 | | |
| 470kΩ | 100,111 | | |
| 162kΩ | 98 | | |
| 15kΩ | 103 | | |
| 1kΩ | 107,113,114 | | |
| 10kΩ | 117,123,126,131 | | |
| 49.9kΩ | 112,120,121,122,128 | | |
| 24.9kΩ | 115,125 | | |
| 787Ω | 118 | | |
| 60.4kΩ | 119 | | |
| 100kΩ | 127 | | |
| 4.99kΩ | 124,130 | | |

Turning to FIG. 4A, the transducer circuitry is connected tot he remote power supply through terminals 61 and 63. Protection circuitry includes diode 157 and the spark gap 177. The capacitor 142 prevents noise from entering the system. The current source 176 and the voltage regulators 159, 160, 161, and 162 form the internal power supply for the remaining circuitry.

The sampling clock 52, on FIG. 4b may be implemented with an RC oscillator formed about comparator 80. The sampling clock 52 triggers the edge triggered one shot 54. The oneshot generates the narrow trigger pulse used to excite the waveguide or delay line 18. It is preferred to use a step up transformer 81 in conjunction with capacitor discharge circuitry to generate the relatively high energy pulse required to excite the delay line. In operation, the capacitors 82 and 83 are charged slowly through resistor 84, to minimize instantaneous current draw. Upon receipt of a triggering pulse from the one shot 54, the FET 169 conducts the charge to ground energizing the primary winding of transformer 81. Pulse shaping circuitry including resistors 105 and 106 cooperate with the Schottky diode 167 to form a rapid rise time pulse to drive the magnetostrictive delay line 18.

The sampling clock 52 also initiates the blanking circuitry implemented as a 20 microsecond oneshot 58. The blanking circuit has two related functions. The output from the one shot, operates through logic gate 171 to blank out the output of the comparator 62 while the comparator out is high, thus preventing false detection of the comparator output resulting directly from excitation of the waveguide 18. Another function of the oneshot 58 is two initiate the count conversion process by removing the reset on the counter to permit counting, as depicted in FIG. 2 on waveform 46.

On FIG. 4A, the mode converter coils 22 are coupled to the input of a high gain amplifier shown on the figure as 60 and associated components. The gain of this amplification stage generates an approximately 75 millivolt signal. The amplifier output is compared with a reference voltage in comparator 62. It is preferred allow the comparator to toggle at signals over 50 millivolts in amplitude. The logic level output of the comparator turns off the conversion clock 64 formed by the NOR gate 89 and associated crystal oscillator components.

Once valid counts are collected by the counter 66, the digital to analog converter 68 converts the number to a corresponding analog value. This analog value is averaged, and used to control the current draw of the transducer system 10. The resolution of the transducer is enhanced by averaging many analog voltage readings. In general, a digital counter cannot resolve beyond the least significant digit because of the quantizing error of plus or minus one bit. Consequently, the resolution of a twelve bit counter is normally limited to 1 out of 4096 bits or 0.024%. However, if the quantizing error is random then a large number of sequential measurements would statistically favor one bit state for the least significant bit of the counter. Therefore by averaging the analog output of the digital to analog converter the resolution is improved beyond the normal capacity of the counter. In the preferred embodiment a sampling rate of 32 hertz is preferred and a one half second time constant, low pass, three pole, active filter 70 is provided to average the output voltage over sixteen measurements. This procedure generates a square root of 16 or 4 times improvement of the underlying resolution, resulting in an effective resolution of 0.006%.

Op amp 164 and the associated switches allow the gauge starting point to be adjusted. In some applications it is desirable to have the "4ma" draw at one end of the gage. This circuitry permits setting the end of the gauge which corresponds to the "4ma" setting. It is also desirable to permit the effective gauge length to be adjusted. The variable resistor 125 sets this span value while the variable resistor 126 is used to zero the gauge.

The op amp 165 forms part of the "current draw" circuitry. In operation, the op amp and the transistor 178 sink current from the remote power supply to indicate the magnitude of the Vsig signal. Feed back from the actual current required to operate the circuitry of the transducer is measured across the current sense resistor 49.

In summary, the sampling clock 52 triggers the interrogation pulse supplied to the waveguide and also starts the blanking timer 58. The blanking timer removes the reset condition on the conversion counter 68 at the conclusion of a fixed blanking time. The mode converter output which results directly from the excitation of the waveguide occurs during this blanking interval and is effectively ignored since the conversion counter is active only at the end of the blanking interval. The next, mode converter output pulse, is the delayed output pulse and this signal is used to turn the conversion clock off. The digital number developed in the counter during this counting window is converted to an analog value and low pass filtered to enhance the resolution of the gauge. The averaged signal is then used to control the current draw of the gauge from a remote supply.

I claim:

1. A magnetostrictive transducer for generating an indication of a position along a gauge comprising:
    a delay line;
    pulse generator means for generating interrogation pulses on said delay line, in response to trigger pulse;
    magnet means proximate said delay line, for converting interrogation pulses into acoustic pulses in said delay line, at the location of said magnet means;
    mode converter means coupled to said delay line for converting said acoustic pulses into corresponding mode converter signals;
    a sampling clock for generating repetitive trigger pulses;
    blanking time means coupled to said sampling clock means for generation a blanking time interval, said blanking time interval initiated by said trigger pulse and extending for a predetermined time, said blanking timer blocking said mode converter signals during said predetermined tim;
    conversion window timer means responsively coupled to said blanking timer for defining a conversion window time period, whereby said conversion window time period begins at the expiration of said blanking time interval, and extends for a variable conversion time,
    said conversion window timer means responsively coupled to said mode converter means, whereby said conversion window time period ends with the reception of said mode conversion signal;
    a conversion clock for generating conversion pulses;
    a conversion counter for counting said conversion pulses during said conversion window time period;
    whereby the digital number in said conversion counter indicates the position of said magnet means along said gauge.

2. The magnetostrictive transducer apparatus of claim 1 further comprising:
    digital to analog conversion means coupled to said conversion counter for generating an analog signal representative of said digital number contained in said conversion counter;
    low pass filter means, coupled to said digital to analog means for generating an averaged signal representative of several conversion count cycles.

3. The magnetostrictive transducer apparatus of claim 2 further comprising:
    remote power supply means for powering said transducer;
    current draw conversion means coupled to said low pass filter means for generating a transducer current draw, from said remote power supply, which is proportional to said averaged signal.

4. The magnetosrictive transducer apparatus of claim 3 wherein:
    said current draw is less than or equal to 20 milliamps and equal to or greater than 4 milliamps, whereby said current draw between these limits represents the measurement value.

5. The magnetosrictive transducer apparatus of claim 1 wherein said pulse generator comprises:
    a oneshot pulse former coupled to said sampling clock for generating a switch pulse in response to each triggering pulse supplied by said sampling clock;
    power amplifier means, coupled to said oneshot pulse former and to said delay line for generating an excitation pulse in said delay line in response to each of said trigger pulses.

6. The magnetosrictive transducer apparatus of claim 5 wherein said power amplifier means comprises:
    energy storage means, for storing energy;
    switching means, coupled to said storage means for discharging said energy storage means during said trigger pulse;
    transformer means coupled to said switching means and to said energy storage means to generate an output pulse in response to the energy discharge during said trigger pulse;
    energy recharging means coupled to said energy storage means, for recharging said energy storage means between said trigger pulses.

7. The magnetostrictive transducer apparatus of claim 1 wherein said sampling clock operates at a frequency of 32hz.

8. The magnetostrictive transducer apparatus of claim 2 wherein said sampling clock operates at a frequency of 32hz, and said low pass filter has a time constant of approximately one half second.

9. The magnetostrictive transducer of claim 2 wherein said low pass filter is a maximally flat, three pole active filter having a time constant of substantially one half second.

* * * * *

UNITED STATES PATENT AND TRADEMARK OFFICE
CERTIFICATE OF CORRECTION

PATENT NO. : 5,070,485

DATED : December 3, 1991

INVENTOR(S) : David S. Nyce

It is certified that error appears in the above-identified patent and that said Letters Patent is hereby corrected as shown below:

Column 2, line 52, please delete the word "drawing" and substitute therefor --drawings--

Column 2, line 65, please delete the word "FIG." and substitute therefor --FIGS.--

Column 2, line 65, please delete the word "diagram" and substitute therefor --diagrams--

Column 3, line 23, please delete the word "comprises" and substitute therefor --comprise--

Column 3, line 29, after the word "second," please insert --a--

Column 3, line 36, after the word "however", please insert --,--

Column 4, line 31, please delete the word "to" and substitute therefor --tO--

Column 4, line 46, please delete the word "exclude" and substitute therfor --excluded--

UNITED STATES PATENT AND TRADEMARK OFFICE
CERTIFICATE OF CORRECTION

PATENT NO. : 5,070,485

DATED : December 3, 1991

INVENTOR(S) : David S. Nyce

It is certified that error appears in the above-identified patent and that said Letters Patent is hereby corrected as shown below:

Column 4, line 53, please delete the word "on" and substitute therefor --in--

Column 5, line 34, please delete the words "process. Once" and substitute therefor --process, once--

Column 5, line 44, please delete the word "FIG." and substitute therefore --FIGS.--

Column 5, line 44, please delete the word "diagram" and substitute therefor --diagrams--

Column 6, line 7, please delete the words "tot he" and substitute therefor --to the--

Column 6, line 13, please delete the word "on" and substitute therefor --in--

Column 6, line 16, please delete the word "oneshot" and substitute therefor --one shot--

Column 6, line 31, please delete the word "oneshot" and substitute therefor --one shot--

Column 6, line 38, please delete the word "oneshot" and substitute therefor --one shot--

UNITED STATES PATENT AND TRADEMARK OFFICE
CERTIFICATE OF CORRECTION

PATENT NO. : 5,070,485

DATED : December 3, 1991

INVENTOR(S) : David S. Nyce

It is certified that error appears in the above-identified patent and that said Letters Patent is hereby corrected as shown below:

Column 6, line 38, please delete the word "two" and substitute therefor --to--

Column 6, line 41, please delete the word "On" and substitute therefor --In--

Column 6, line 42, please delete the word "on" and substitute therefor --in--

Column 6, line 47, after the word "preferred", please insert the word --to--

Column 7, line 10, please delete the word "gage" and substitute therefor --gauge--

Column 7, line 54, claim 1, please delete the word "generation" and substitute therefor --generating--

Column 7, line 58, claim 1, please delete the word "tim" and substitute therefor --time--

Column 8, line 34, please delete the word "oneshot" and substitute therefor --one shot--

Column 8, line 38, please delete the word "oneshot" and substitute therefor --one shot--

UNITED STATES PATENT AND TRADEMARK OFFICE
CERTIFICATE OF CORRECTION

PATENT NO. : 5,070,485

DATED : December 3, 1991

INVENTOR(S) : David S. Nyce

It is certified that error appears in the above-identified patent and that said Letters Patent is hereby corrected as shown below:

Column 8, line 34, please delete the word "former" and substitute therefor --transformer--

Column 8, line 39, please delete the word "former" and substitute therefor --transformer--

Column 8, line 57, please delete "32hz" and substitute therefor --32Hz--

Column 8, line 60, please delete "32hz" and substitute therefor --32Hz--

Signed and Sealed this

Eighteenth Day of January, 1994

*Attest:*

BRUCE LEHMAN

*Attesting Officer*   *Commissioner of Patents and Trademarks*